US012748312B2

(12) United States Patent
Wang et al.

(10) Patent No.: US 12,748,312 B2
(45) Date of Patent: Sep. 29, 2026

(54) HEAD MOUNTABLE DISPLAY AND LIGHT SEAL MASK

(71) Applicant: Apple Inc., Cupertino, CA (US)

(72) Inventors: Paul X. Wang, Sunnyvale, CA (US); Benjamin A. Shaffer, San Jose, CA (US); Jeremy C. Franklin, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 27 days.

(21) Appl. No.: 18/598,973

(22) Filed: Mar. 7, 2024

(65) Prior Publication Data

US 2024/0210711 A1 Jun. 27, 2024

Related U.S. Application Data

(63) Continuation of application No. PCT/US2022/076677, filed on Sep. 19, 2022.

(60) Provisional application No. 63/261,534, filed on Sep. 23, 2021.

(51) Int. Cl.

*G06F 3/041* (2006.01)
*G02B 27/01* (2006.01)
*G06K 7/10* (2006.01)

(52) U.S. Cl.

CPC ..... *G02B 27/0176* (2013.01); *G02B 27/0172* (2013.01); *G06K 7/10316* (2013.01); *G02B 2027/014* (2013.01); *G02B 2027/0141* (2013.01); *G02B 2027/0156* (2013.01); *G02B 2027/0169* (2013.01)

(58) Field of Classification Search

None

See application file for complete search history.

(56) References Cited

U.S. PATENT DOCUMENTS

2010/0079356 A1 4/2010 Hoellwarth
2015/0199064 A1* 7/2015 Cho .................. G02B 27/0179 345/173
2017/0011553 A1* 1/2017 Chen .................. G02B 27/0172
2018/0004481 A1* 1/2018 Fallon ................. G06F 3/04815
2021/0132397 A1* 5/2021 Stellman ............ G02B 27/0172

OTHER PUBLICATIONS

PCT International Search Report for International Application No. PCT/US2022/076677, mailed Jan. 13, 2023 (12 pp.).

* cited by examiner

*Primary Examiner* — Carl Adams
(74) *Attorney, Agent, or Firm* — Dorsey & Whitney LLP

(57) ABSTRACT

An electronic device includes a head mountable display having a sensor and a light seal removably connectable to the HMD. The light seal can include an identification feature detected by the sensor. In one example, the HMD includes a display screen configured to display a confirmatory image and the light seal can include a unique visual component corresponding to the confirmatory image. In another example, the HMD can include an optical lens connection feature and the sensor can detect a depth of the light seal.

16 Claims, 10 Drawing Sheets

HEAD MOUNTABLE DISPLAY AND LIGHT SEAL MASK

CROSS-REFERENCE TO RELATED APPLICATION(S)

This application is a continuation of International Application No. PCT/US2022/076677, filed 19 Sep. 2022, and entitled "LIGHT SEAL," which claims priority to U.S. Provisional Patent Application No. 63/261,534, filed 23 Sep. 2021, and entitled "LIGHT SEAL," the entire disclosures of which are hereby incorporated by reference.

FIELD

The described examples of the present disclosure relate generally to wearable electronic devices. More particularly, the examples of the present disclosure relate to light shields and components of head mountable displays.

BACKGROUND

Recent advances in portable computing have enabled wearable devices used for creating virtual and augmented reality experiences. These wearable electronic devices can include head mountable display (HMD) devices that display images to the user when donned. The virtual reality (VR)/alternative reality (AR) experience generated by an HMD can be enhanced by isolating the displayed images from external ambient light. This can be done using a light seal or shroud that blocks ambient light out while using the HMD. However, to be most effective, light seals can be fitted to form a complete barrier between the user's face or head and the HMD. When a single HMD is used by multiple users, with each user having their own fitted light seal, it can be difficult to distinguish one light seal from another.

SUMMARY

In one aspect of the present disclosure, an electronic device includes a head mountable display (HMD) having a sensor and a light seal removably connectable to the HMD. The light seal can include an identification feature detectable by the sensor.

In one example, the HMD further includes a display screen and the electronic device further includes a securement band connected to the HMD. In one example, the light seal further includes an antenna. In one example, the identification feature includes an electromagnetic signal transmitted by the antenna. In one example, the electronic device further includes an electromagnetic signal transmitted by the antenna. In one example, the electronic device further includes a memory component including user-specific data. In one example, the antenna transmits the user-specific data to the HMD. In one example, the light seal is fitted to a face.

In one aspect of the present disclosure, a wearable electronic device can include a light seal including an identification feature and a head mountable display (HMD) that is removably connectable to the light seal. The HMD can include a display screen configured to display a confirmatory image associated with the identification feature.

In one example, the HMD further includes a sensor configured to detect the identification feature. In one example, the confirmatory image is shown on the display when the sensor detects the identification feature. In one example, the identification feature includes a unique visual component corresponding to the confirmatory image. In one example, the confirmatory image and the unique visual component include a common color. In one example, the confirmatory image and the unique visual component include a common symbol. In one example, the wearable electronic device further includes an ambient light sensor configured to detect a presence of the light seal. In one example, the wearable electronic device further includes a time of flight sensor configured to detect a depth of the light seal.

In one aspect of the present disclosure, a head mountable display (HMD) can include a sensor, an optical lens connection feature, and a removable shroud having a depth and an identification feature associated with the depth.

In one example, the HMD further includes a display screen and the optical lens connection feature is configured to removably connect an optical lens to the HMD adjacent to the display screen. In one example, the HMD can further include a processor that determines if the removable shroud is appropriate for connecting to the HMD based on the depth. In one example, the HMD can further include a memory component configured to store data including the depth. In one example, the processor is configured to determine whether an optical lens is connected to the optical lens connection feature when determining if the removable shroud is appropriate for connecting to the HMD.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1:
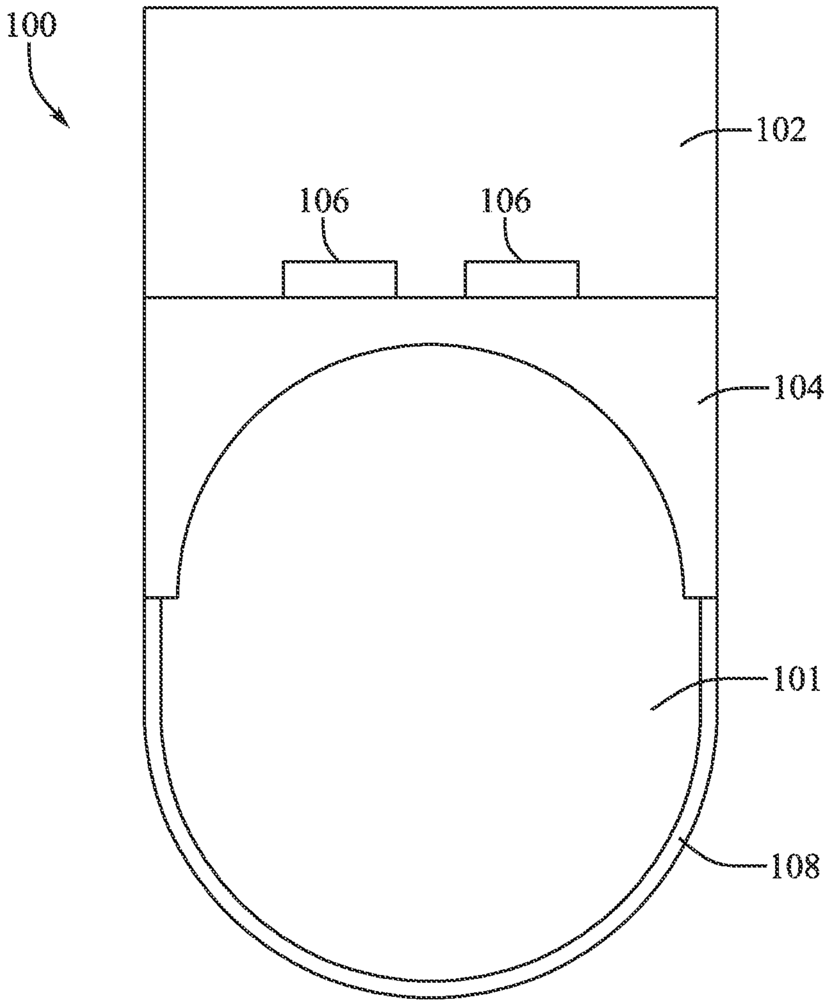
FIG. 1 shows a top view of an example of a wearable electronic device.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The following disclosure relates to head mountable display (HMD) devices, systems and methods. In one example an HMD can include a display module having a display screen and a sensor and a light seal removably connectable to the display portion. The light seal can include an identification features detected by the sensor. HMD devices and components thereof described in the present disclosure enable users to ensure that the proper components are being used in order to enhance the user's experience.

HMD devices can be used to create virtual or augmented reality (VR/AR) experiences at least in part by outputting visual images to the user when the user dons the device. These visual images can be produced by a display portion having one or more display screens. However, in order to isolate the viewable light to only images produced by the display screens, and thus enhance the immersive quality of the VR/AR environment, it is advantageous to block out any ambient light produced external to the device. Accordingly, light seals can be removably connected to the HMD, which can form a light blocking barrier surrounding the HMD and filling any space between the user's eyes and the display screens of the HMD that may otherwise exist for ambient or external light to reach the user's eyes.

An effective light seal is one that is fitted or shaped to form an unbroken contact between an edge of the light seal and the user's face, including cheeks, nose, and brow or forehead. In this way, no external light can enter between the light seal and the user's face. Because each user has a unique facial structure and shape, light seals described herein can be customized and fitted to each user in order to achieve the unbroken contact. Users can be fitted by a number of methods upon purchase of the light seal, including facial scans or other facial measurement systems that measure facial topographies. Light seals can then be custom manufactured to compliment the user's measured facial topography. Other methods can include fitting sessions where a user tries on multiple light seals having various contour features until a suitable light seal is found. Other methods can include manufacturing light seals with soft, pliable materials that form to the user's face once worn.

In any case, light seals described herein can be fitted to specific users in order to enhance the user's experience with the HMD. However, variations between one user's fitted light seal and another may be difficult to discern because differences can be small and difficult to visually detect. This can be an issue where a number of users, each having their own fitted light seal, use the same HMD. In such a situation, each light seal can be removably connected to the HMD so that only one HMD can be used by multiple users. This may be the case in a household having multiple users of a single HMD device, or within an office setting, and so forth. Again, because the differences between fitted light seals may be too slight to visually detect, the HMD devices described herein, including light seal components thereof, are configured to automatically assist the user in determining whether the light seal being used is the correct light seal.

Similarly, different use cases of the same HMD may require different light seals to be used. Some light seals may be more appropriate for certain VR/AR experiences, be they interactive video games, movies, or other VR/AR experiences. In addition, some users may add or subtract various components from the HMD for use, and corresponding light seals may be appropriate for use with HMDs having some of those components but not others. For example, some users can connect prescription optical lenses to the HMD at or near a display screen such that users needing prescription glasses or contacts can use the HMD without wearing their contacts or glasses, increasing their comfort and convenience in using the HMD. However, the presence or absence of such optical lenses connected to the HMD can change a preferred or appropriate size or shape of the light seal.

In addition, each user of a singular HMD device can prefer their own user settings, such as display brightness, speaker volume, selectable menus, or other settings, when using the device.

The HMD devices and light seals thereof described in the present application address these and other concerns by including sensors on the HMD, and identification features on the light seals that can be detected by the sensors. This allows the HMD to determine whether the appropriate light seal is being used based on a user associated with the specific light seal being connected to the HMD and/or the contemplated activity. User-specific data and information can be relayed or retrieved by the HMD based on the identification of the light seal to update or apply certain user settings or to determine whether the light seal being used is the one fitted to the user using the device. These determinations can be done automatically without the user needing to manually input information or modify select settings.

These and other embodiments are discussed below with reference to FIGS. 1-15. However, those skilled in the art will readily appreciate that the detailed description given herein with respect to these Figures is for explanatory purposes only and should not be construed as limiting. Furthermore, as used herein, a system, a method, an article, a component, a feature, or a sub-feature comprising at least one of a first option, a second option, or a third option should be understood as referring to a system, a method, an article, a component, a feature, or a sub-feature that can include one of each listed option (e.g., only one of the first option, only one of the second option, or only one of the third option), multiple of a single listed option (e.g., two or more of the first option), two options simultaneously (e.g., one of the first option and one of the second option), or combination thereof (e.g., two of the first option and one of the second option).

FIG. 1 shows a top view of a wearable electronic device 100, including a head mountable display (HMD) 102, a light seal 104 removably connectable to the HMD 102, and a securement band 108 removably secured to the light seal 104. Light seals described herein, including light seal 104, can also be referred to as a light shield, a light shroud, or an HMD shroud, or simply as a seal, shield, or shroud. The securement band 108 can removably secure the device 100 to the head 101 of a user so that the user's eyes can see the displays 106. In one example, the HMD 102 includes two separate displays 106, which can each include one or more display screens configured to emit light to the user's eyes. In one or more other examples, the HMD 102 can include a single display 106 or more than two displays 106.

In at least one example, the light seal 104 is configured to be removably connected to the HMD 102 through one or more connection mechanisms (not shown in FIG. 1) on the light seal 104 and/or the HMD 102. When donned by the user, the device 100 is configured to display images to the user via the displays 106 as part of a VR/AR environment. In VR/AR environments, it is desirable to block out any exterior/peripheral light other than that produced or generated by the HMD 102 at the displays 106. In this way, the experience for the user can be limited to the displays 106 of the HMD 102 to produce an immersive, unobstructed experience with a VR/AR environment.

Along these lines, the light seal 104 is configured to press against the forehead and face, including nose and cheeks, of the user as shown in FIG. 1. As noted above, the light seal 104 can be fitted and customized to the user such that portions of the light seal 104 making contact with the user compliment the contours and shape of the user's face and head 101. In this way, when the user dons the device 100, the light seal 104 can block out any ambient light from the environment external to the device.

Any of the features, components, parts, including the arrangements and configurations thereof shown in FIG. 1 can be included, either alone or in any combination, in any of the other examples of devices, features, components, and parts shown in the other figures. Likewise, any of the features, components, parts, including the arrangements and configurations thereof shown in the other figures can be included, either alone or in any combination, in the example of the devices, features, components, and parts shown in FIG. 1. Further details of the electronic device are provided below with reference to FIG. 2.

Figure 2:
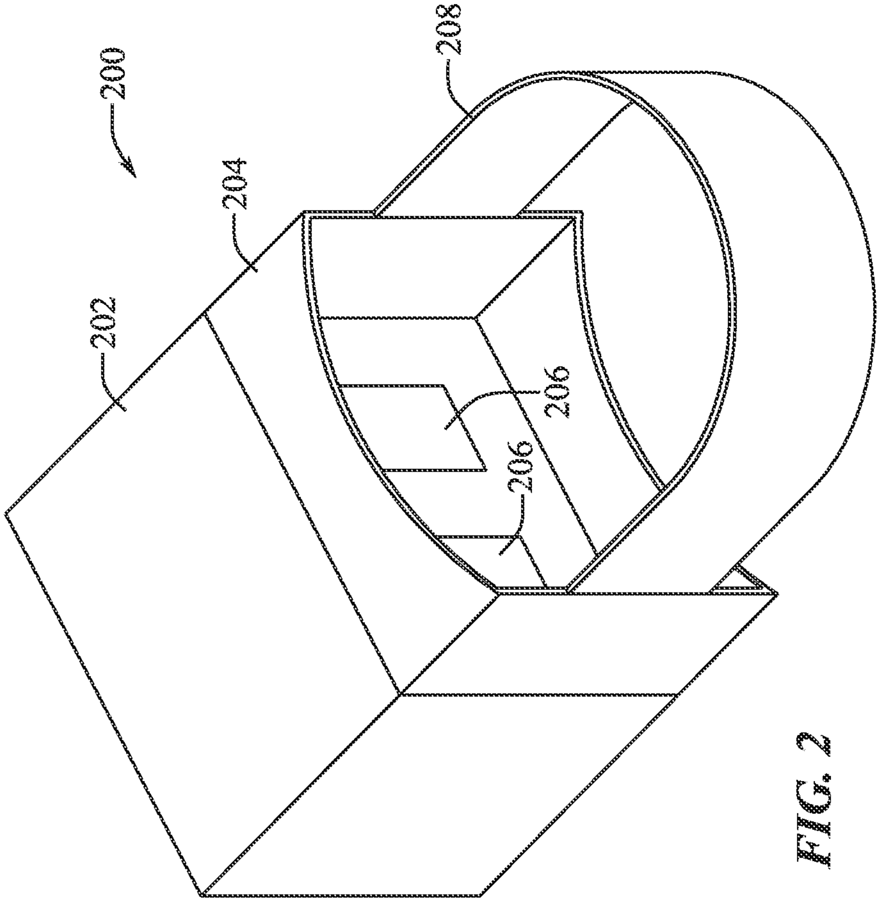
FIG. 2 shows a perspective view of an example of a wearable electronic device.

FIG. 2 shows a rear, perspective view of another example of an electronic device 200 that includes an HMD 202, a light seal 204, and a securement band 208. As shown in the illustrated perspective view of FIG. 2, the light seal 204 that is removably connected to the HMD 202 is configured to surround an outer edge of a side of the HMD 202 intended to be oriented toward the user's face during use such that the light seal 204 is configured to contact a user's face and head to block out light. When connected to the HMD 202 as shown, the light seal 204 provides a seal through which the user can visualize the displays 206 while wearing the device 200.

Figure 3:
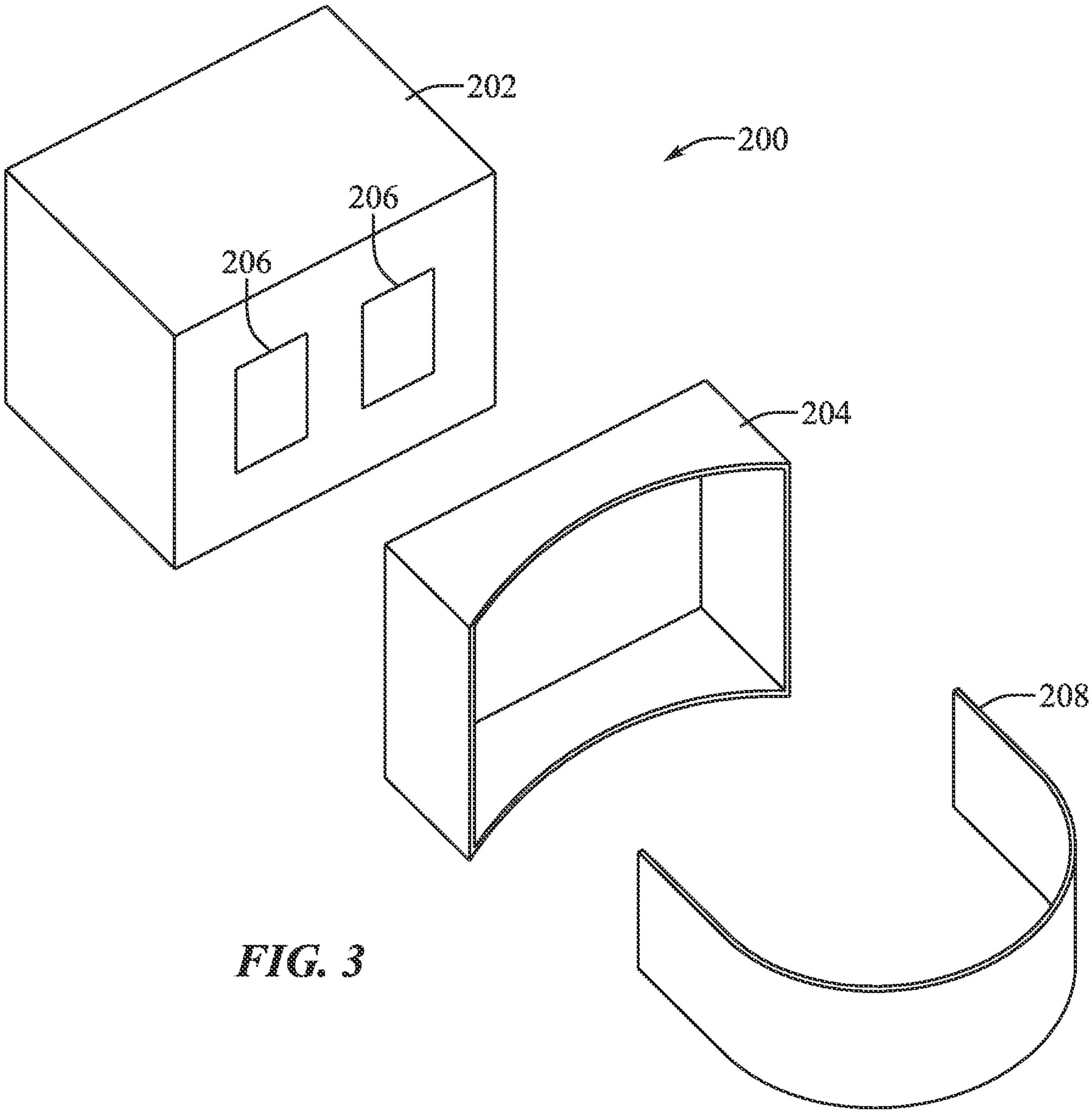
FIG. 3 shows an exploded perspective view of an example of a wearable electronic device.

In at least one example, as shown in FIG. 3, the light seal 204 is removable from and re-connectable to the HMD 202 and the securement band 208. In this way, the user can disconnect one light seal and connect another, as needed. As noted above, each light seal, such as light seal 204 shown in the figures, can be customized such that the shape of the light seal 204 forms a consistent seal around an inner edge configured to press against a specific user's face. Because each user has unique features such as head size, nose shape, and bone structure, each user may desire to use their own fitted, customized light seal 204 to best block out external light during use.

However, in some examples, a single HMD 202 may be owned or used by multiple users, such as a group of user's within an office environment or a family within a home. In such examples, the same HMD 202 portion of the device 200 can be used with multiple light seals 204. Each light seal can be fitted to a specific user, who upon use of the device 200, can removably connect his or her own light seal to the HMD 202 before donning the device 200. Thus, as shown in FIG. 3, the light seal 204 is detachable/disconnectable from the HMD 202 to facilitate use by multiple users.

In addition, in at least some examples, the securement band 208 is detachable/disconnectable from the light seal 204 and/or the HMD 202. In such examples, the securement band 208 can be fitted or otherwise customized to each unique user similar to the light seal 204. That is, the size, length, thickness, material, or appearance of the securement band 208 can be customized for each user. The user can then removably attach/connect the securement band 208 to their own light seal 204 before donning the device 200. Alternatively, the securement band 208 can be connected to the light seal 204 such that the securement band 208 and light seal 204 are more permanently attached or generally connectable together to the HMD 202 before use. Alternatively, the securement band 208 can be commonly used amongst multiple users and can be adjustable in size.

Any of the features, components, parts, including the arrangements and configurations thereof shown in FIGS. 2 and 3 can be included, either alone or in any combination, in any of the other examples of devices, features, components, and parts shown in the other figures. Likewise, any of the features, components, parts, including the arrangements and configurations thereof shown in the other figures can be included, either alone or in any combination, in the example of the devices, features, components, and parts shown in FIGS. 2 and 3. Further details of an exemplary HMD configuration are provided below with reference to FIGS. 4-9.

Figure 4:
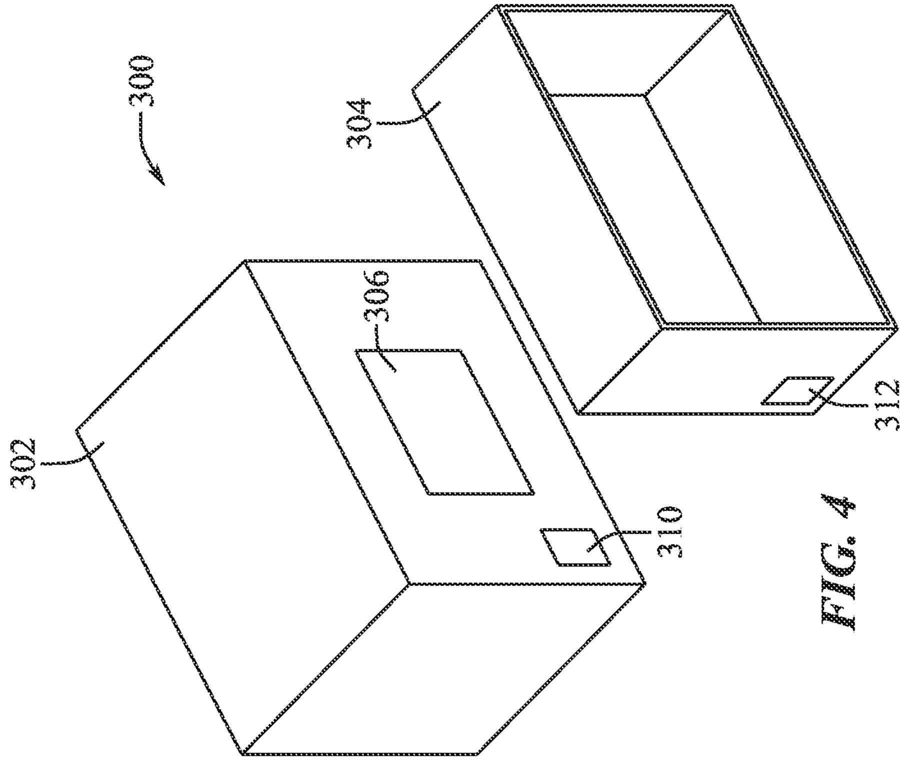
FIG. 4 shows an exploded perspective view of an example of a wearable electronic device.

FIG. 4 illustrates another example of a device 300 that includes an HMD 302 and a light seal 304. As shown, in at least one example, the light seal 304 can be a separate component from the HMD 304, and the light seal 304 can be removably connected to, and disconnected from, the HMD 302 as needed for one or more users to connect/attach their own unique light seal 304 to the HMD 302 for use. In at least one example, the HMD 302 includes a display 306 and a sensor 310. The display 306 can be a singular display, similar to individual displays shown in other figures, and can include a display screen projecting or generating images for viewing by the user. Additionally, any number of lenses, filters, or other optical components can be associated with the display 306 to modify or facilitate the projection and/or generation of images for viewing by the user.

In at least one example, the light seal 304 can include an identification feature 312. The sensor 310 can be configured to sense or detect the identification feature 312 either before or after the light seal 305 is connected to the HMD 302. In one example, the sensor 310 senses/detects the identification feature when the light seal 304 is disconnected from the HMD 302 prior to use, as shown in FIG. 4, and when the identification feature is in close enough proximity to be sensed by the sensor 310. The terms "sensed" and "detected," when referencing the sensor 310, can be used interchangeably herein. In either case, the sensor 310 is configured to receive one or more signals, be they visual, electromagnetic, or other signals, from the identification feature 312 of the light seal 312.

In some examples, the identification feature 312 of the light seal 304 can emit signals to be sensed by the sensor 310 of the HMD 302. For example, the sensor 310 and/or the identification feature 312 can include an electromagnetic signal transmitted by one or more transmitter/receiver antennas, including UWB stacks, Bluetooth modules, and other antenna modules, and Hall Effect sensors and magnets, and the like. In such examples, even if not visually apparent from the point of view of the sensor 310, the identification feature 312 can be detected as the light seal 304 is brought into a vicinity of the HMD 302 and the associated sensor 310, even before the light seal 304 is connected to the HMD 302.

In other examples, the identification feature 312 can be passive in that the identification feature does not include an emitted signal, but rather, is otherwise sensed by the sensor 310, such as by a visual or tactile recognition. In such examples, the sensor 310 can include an optical sensor such as a camera that visually detects the identification feature 312, which can include a visual symbol or design. In some examples, the identification feature 312 can include a bar code or a QR code, and the sensor 310 can include a scanner to read the bar code or QR code. In some examples, the sensor can include a time of flight (TOF) sensor to detect the presence and distance of the identification feature 312. In some examples, the sensor 310 can include other sensors such as IR sensors, RF tags, and the like. In such examples, even if not visually apparent from the point of view of the sensor 310, the identification feature 312 can be detected as the light seal 304 is brought into a vicinity of the HMD 302 and the associated sensor 310, even before the light seal 304 is connected to the HMD 302.

In some examples, the identification feature 312 of the light seal 304 can include a memory component and one or more other electronic components configured to communicate with the sensor 310 of the HMD 302 via circuitry. This communication can occur using wires and other physical electrical connections between the light seal 304 and the HMD 302. For example, the identification feature 312 can include a memory component, or a separate memory component can be connected to, or associated with, the identification feature, and physical circuitry can connect the memory component to an electrical connector (not shown) of the light seal 304. When the light seal 304 is connected to the HMD 302 as described above, for example through a connection feature of the light seal 304 and/or HMD 302, the electrical connector of the light seal 304 can electrically connect to an electrical connection feature of the HMD 302. Once the electrical connection between the light seal 304 and the HMD 302 has been made, a unified circuit including once or more wires, PCBs, processors, and the like, can transmit data from the identification feature 312 to the sensor 310. In such an example, the sensor 310 of the HMD 302 can include one or more electronic components, for example a processor and a memory component, that receives the transmitted signal and identifies the identification feature 312.

Accordingly, the sensor 310 and the identification feature 312 of the device 300 are configured to communicate. In at least one example, the identification feature 312 of the light seal 304, and by association, the light seal 304, is uniquely associated with a user. In at least one example, once the identification feature 312 is detected by the sensor 310, data associated with the user uniquely associated with the identification feature 312, and thus uniquely associated with the light seal 304, can be retrieved and applied by the device 300 during use. In one example, the light seal 304 includes a memory component and/or one or more processors and associated circuitry that stores the user-specific data. In one or more examples, the data for various users can be stored on one or more memory components (not shown) of the HMD 302 such that once the light seal 304 is detected via the identification feature, the user-specific data associated with the unique identification feature 312 can be accessed/retrieved by one or more processors or other components of the HMD 302. In either case, user-specific data, which can include user-specific settings, can be applied by the HMD 302 during use.

In this way, when a user connects his or her own light seal 304, which has been customized and fitted to that user, to the HMD 302, the HMD 302 can automatically apply user specific settings. This can occur prior to the connection between the light seal 304 and the HMD 302, or after the connection has been made. In either case, once the sensor 310 and associated processing components of the HMD 302 have detected and identified the identification feature 312 of the light seal 304, as discussed above, the HMD can adjust and modify settings corresponding to the particular user.

Any of the features, components, parts, including the arrangements and configurations thereof shown in FIG. 4 can be included, either alone or in any combination, in any of the other examples of devices, features, components, and parts shown in the other figures. Likewise, any of the features, components, parts, including the arrangements and configurations thereof shown in the other figures can be included, either alone or in any combination, in the example of the devices, features, components, and parts shown in FIG. 4.

Figure 5:
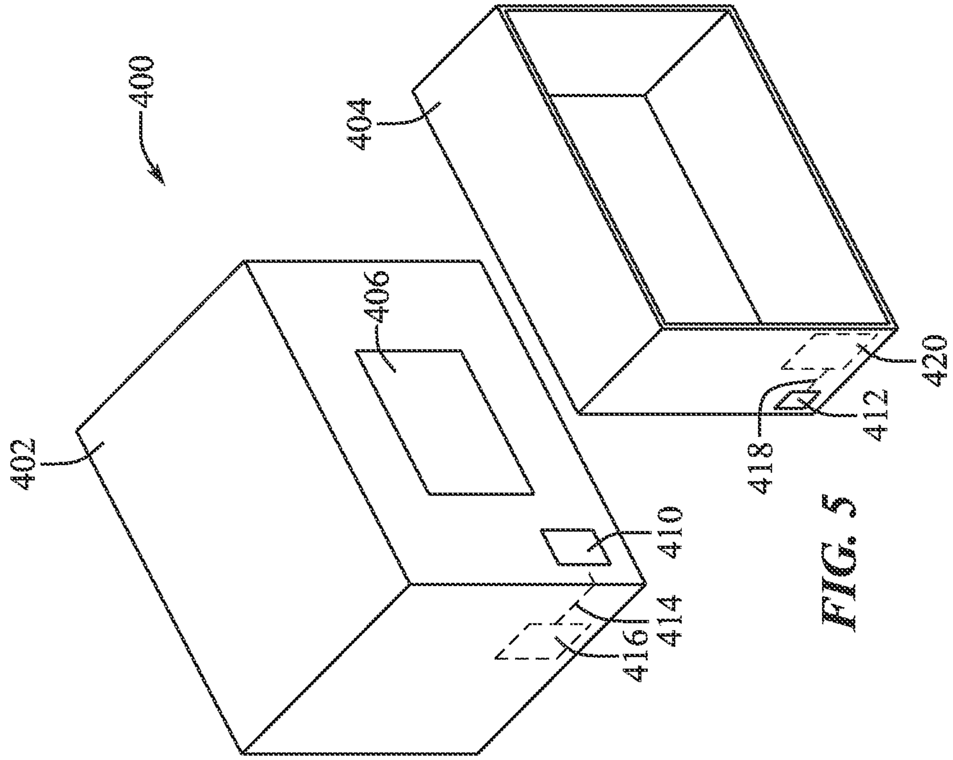
FIG. 5 shows an exploded perspective view of an example of a wearable electronic device.

FIG. 5 shows another example of a device 400 that includes an HMD 402 and a light seal 404, which are shown as physically separated, but can be removably connected together similar to other devices described herein. In at least one example, the HMD 402 includes a display 406 and a sensor 410. The light seal 404 can include an identification feature 412 configured to communicate with, or at least be sensed/detected by, the sensor 410 of the HMD 402. As noted above, user-specific data, including instructions to apply certain user settings and/or including the user-specific settings themselves, can be stored in a memory component on either the light seal 404 or the HMD 402.

In examples where the user settings and other data pertaining the user associated with the identification feature 412 (and thus associated with the light seal 404) are stored on the HMD 402, the HMD 402 can include one or more other electronic components 416 in communication with the sensor 410 via circuitry 414. In one example, the electronic components 416 can include one or more processors configured to identify the user-specific data and/or settings associated with the detected identification feature 412 and can then apply those settings to the HMD 402. The electronic components 416 can also include one or more memory components that store the user-specific data retrieved and/or processed by the processor.

In examples where the user settings and other data pertaining the user associated with the identification feature 412 (and thus associated with the light seal 404) are stored on the light seal 404, the light seal 404 can include one or more other electronic components 420 in communication with the sensor identification feature 412 via circuitry 418. In one example, the electronic components 420 can include one or more processors configured to identify or access the user-specific data and/or settings associated with the detected identification feature 412 and instruct one or more antennas or other components to transmit the data to the HMD 402, either to the sensor 410 or other electronic components 416 described above. In turn, the one or more electronic components 416 of the HMD 402 can then apply those settings to the HMD 402. The electronic components 420 of the light seal 420 can also include one or more memory components that store the user-specific data collected, retrieved, and/or processed by other components discussed above.

User settings can include any number of output features and/or characteristics of output features output by the HMD 402. In one example, a first set of icons representing a list of games or other content in a selectable menu can be output by the display 406 to a first user in response to detecting an identification feature 412 associated with the first user. The first set of icons can represent pre-selected icons or automatically or learned icons based on the first user's history of use. Similarly, a second separate set of icons can be presented to another user based on a different identification feature 412 and light seal 404 sensed for use with a different user. As noted above, any number of other settings can be uniquely associated with each unique light seal 404, including display brightness, HMD speaker volume, content menus displayed by the HMD, user history and information including connections between the HMD and any other devices typically used and accessed by the specific user such as smartwatches, phones, tablets, laptops, and the like.

As noted above, each set of user-specific data can be pre-selected by the user themselves. Alternatively, in some examples, data such as preferred user settings and usage history can be learned by the device 400 using one or more algorithms, for example artificial intelligence algorithms, configured to learn a user's preference and store data regarding those preferences, as described above. Once connected to a particular light seal 404, the data corresponding to the user associated with that light seal 404 (and identification feature 412) can be retrieved and applied to enhance the user's experience with customized settings.

In at least one example, the sensor 410 of the HMD 402 can sense one or more other devices worn or carried by the user. The HMD 402 can then identify the user based on these other devices, either separately or in conjunction with the detection of the light seal 404, as described above. For example, if the user is wearing a smartwatch and/or carrying a mobile phone in his or her pocket, the sensor 410 can be configured to communicate with the smartwatch and/or mobile phone, via one or more antennas of those devices, when the user approaches or is within the vicinity of the device 400. Data can be transmitted from the smartwatch and/or mobile phone that includes owner or user identification information such that the electronic components 416 of the HMD 402, including one or more processors, can identify the user based on the watch or phone. In one example, the light seal 404 of that same user, which may be carried by the user or otherwise within the vicinity of the HMD 402, can be detected and identified as being associated with the user/owner of the watch and/or mobile phone.

In this way, a system of sensors and antennas of various devices, including the sensors 410 of the HMD 402 and antennas 412 of the identification feature 412 of the light seal 404 can work in conjunction with one another as part of a sensor system to detect and identify a user within a vicinity of the device 400. Then, as described above, the information transmitted or otherwise gathered from the system of devices, antennas, and sensors, can instigate the application of user-specific settings before and during use of the device 400.

Any of the features, components, parts, including the arrangements and configurations thereof shown in FIG. 5 can be included, either alone or in any combination, in any of the other examples of devices, features, components, and parts shown in the other figures. Likewise, any of the features, components, parts, including the arrangements and configurations thereof shown in the other figures can be included, either alone or in any combination, in the example of the devices, features, components, and parts shown in FIG. 5.

In yet other examples, the sensor 410 of the HMD 402 can be configured to recognize the face or other user features, including eye detection using iris matching, fingerprint detection upon picking up the device 400, and so forth. In some instances, it can be difficult for a user to distinguish their own light seal 404 from another user's light seal because the fitted features and variations between light seals can be subtle. In such a circumstance, it is useful to have a method or system configured to confirm that the light seal 404 connected to the HMD 402 is actually the correct light seal 404 that is fitted or otherwise corresponds to the user.

Figure 6:
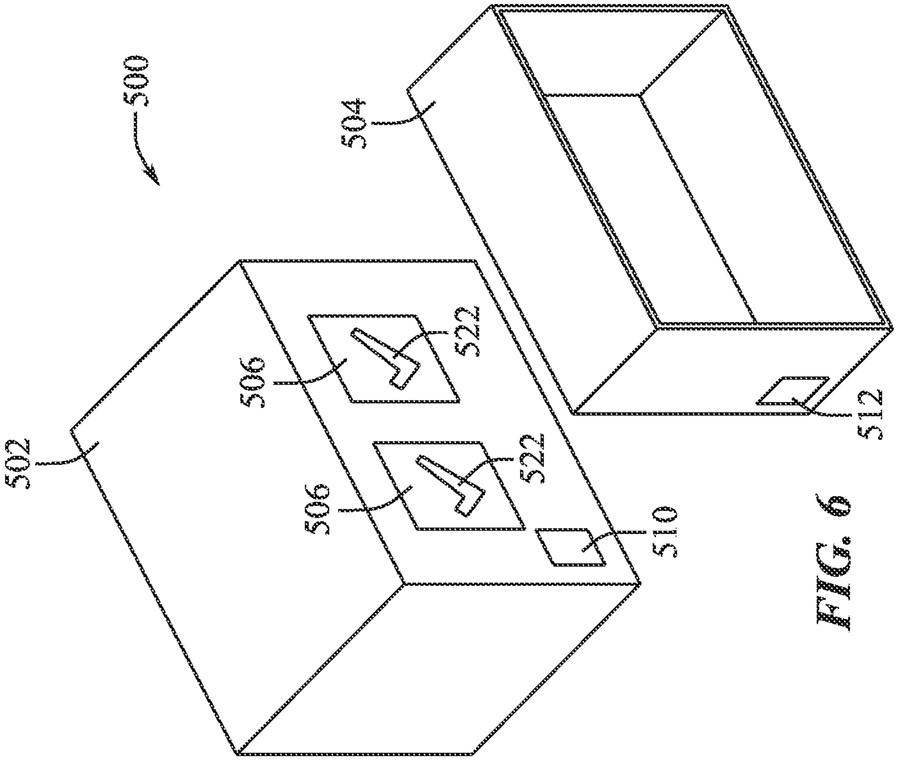
FIG. 6 shows an exploded perspective view of an example of a wearable electronic device.
Figure 7:
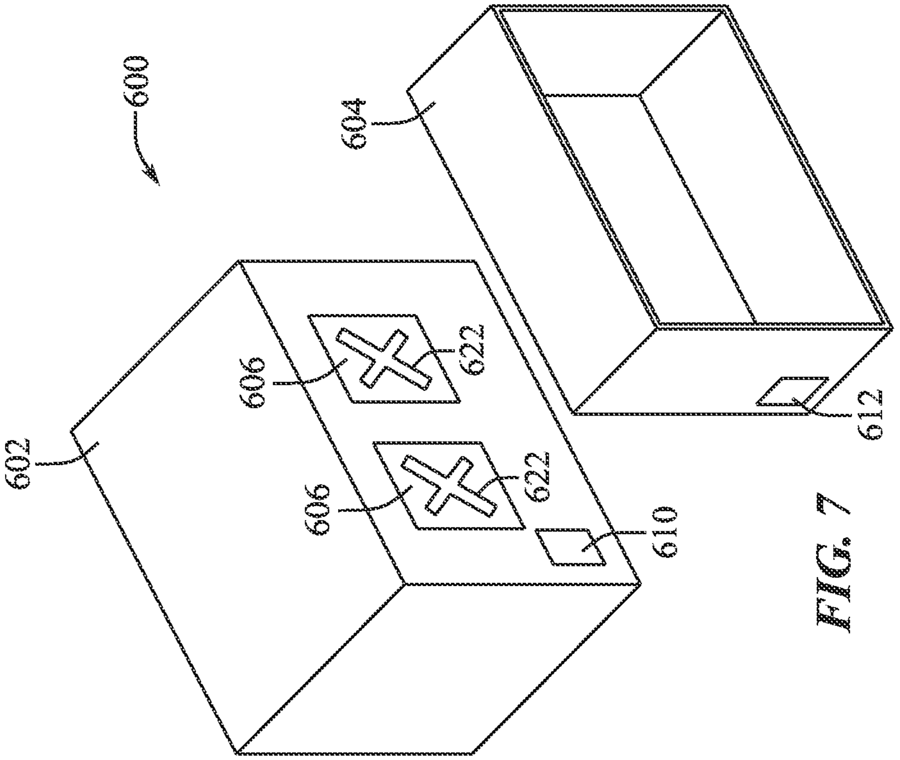
FIG. 7 shows an exploded perspective view of an example of a wearable electronic device.

Along these lines, FIGS. 6 and 7 show examples of devices 500, 600, respectively, that include outputs 506, 606 of displays 506, 606 that indicate whether the correct light seal 504 is being connected, or has been connected, to the HMD 502, 602. For example, FIG. 6 shows a device 500 that includes an HMD 502 and a light seal 504. The HMD 502 includes a sensor 510 configured to detect the identification feature 512 of the light seal 504 and identify, as discussed above, the light seal 504 and user associated with the identification feature 512. As noted above, the user may already be identified such that one or more processing components of the HMD 502 can determine if the light seal 504 being connected or already connected thereto is the appropriate light seal 504 corresponding to the identified user. If so, the HMD 502 can be configured to confirm to the user that the correct/appropriate light seal 504 is being connected.

In the illustrated example of FIG. 6, a confirmatory image 522, such as the check marks shown, can be displayed to the user when the correct light seal 504 is connected or being connected. Check marks are shown as exemplary confirmatory images 522, but it is understood that any image confirming the correct light seal 504 connection can be generated at one or more of the displays 506. Additionally, or alternatively, at least one example can include one or more other outputs confirming the correct connection between the light seal 504 and the HMD 502, including tactile feedback such as vibrations, audio feedback including confirmatory sounds, or any combination thereof.

FIG. 7 shows an example of a device 600 producing a feedback output 622 indicating that an inappropriate or incorrect light seal 604 is about to be connected based on the sensor 610 of the HMD 602 detecting the identification feature 612 of the light seal 604. An inappropriate or incorrect light seal 604 can be one that is not fitted or otherwise associated with the user, as detected prior to or after connecting to the HMD 602. Like the confirmatory images 522 including check marks shown in FIG. 6, the "X" marks of the output images 622 produced by the displays 606 in FIG. 7 are shown as exemplary only. It will be understood that any image indicating the incorrect light seal 604 connection can be generated at one or more of the displays 606. Additionally, or alternatively, at least one example can include one or more other outputs confirming the correct connection between the light seal 604 and the HMD 602, including tactile feedback such as vibrations, audio feedback including confirmatory sounds, or any combination thereof.

Any of the features, components, parts, including the arrangements and configurations thereof shown in FIGS. 6 and 7 can be included, either alone or in any combination, in any of the other examples of devices, features, components, and parts shown in the other figures. Likewise, any of the features, components, parts, including the arrangements and configurations thereof shown in the other figures can be included, either alone or in any combination, in the example of the devices, features, components, and parts shown in FIGS. 6 and 7.

Figure 9:
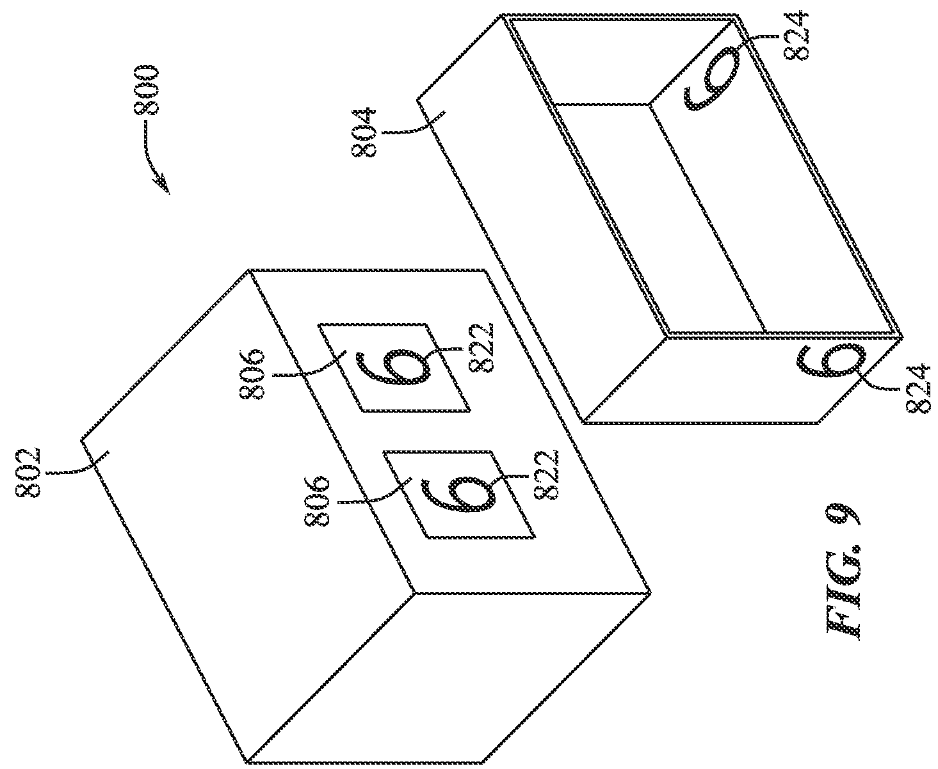
FIG. 9 shows an exploded perspective view of an example of a wearable electronic device.
Figure 8:
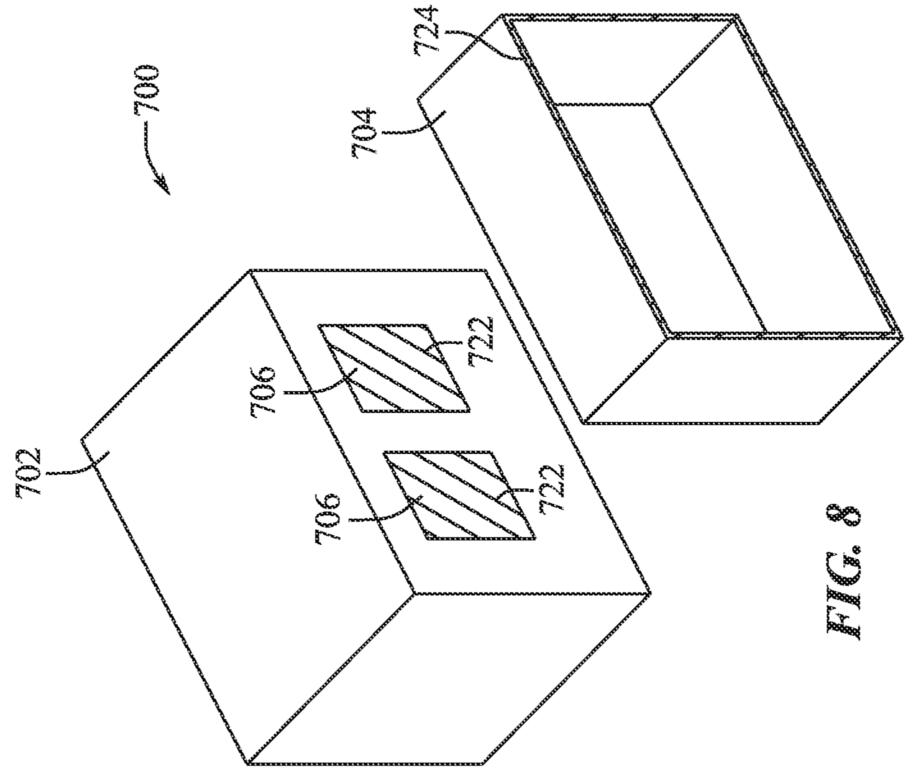
FIG. 8 shows an exploded perspective view of an example of a wearable electronic device.

FIGS. 8 and 9 include further examples of confirmatory features or outputs that can inform the user whether the light seal 704, 804 is appropriate for the HMD 702, 802 based on the detected/identified user and/or based on compatibility between the HMD 702, 802 and the light seal 704, 804. For example, as shown in FIG. 8, a unique visual component 724 can be printed or otherwise visually shown on a portion of the light seal 704. The displays 706 of the HMD 702 can generate a matching or otherwise corresponding confirmatory visual 722 to indicate to the user that the correct light seal 704 is being connected or is already connected. The unique visual component 724 can include a color, a pattern, a visual design, a symbol, or other visual indicators that may or may not match or be common with the generated confirmatory visual 722 of the HMD 702 displays 706.

Similarly, as shown in FIG. 9, one or more symbols 824 of the light seal 804 can correspond to generated symbols 822 at one or more displays of the HMD 802, as shown. The illustrated example includes the number "6" but can include any symbol in one or more other examples. As noted above, rather than the confirmatory images 722 and symbols 822 shown in FIGS. 8 and 9, one or more tactile and/or audio feedback features can be generated by the HMD 802 or the light seal 804 to confirm or reject the light seal 804. In at least one example, the symbols 824 of the light seal 804 can be a part of the identification feature of the light seal 804 such that the identification feature includes the symbol 824.

Any of the features, components, parts, including the arrangements and configurations thereof shown in FIGS. 8 and 9 can be included, either alone or in any combination, in any of the other examples of devices, features, components, and parts shown in the other figures. Likewise, any of the features, components, parts, including the arrangements and configurations thereof shown in the other figures can be included, either alone or in any combination, in the example of the devices, features, components, and parts shown in FIGS. 8 and 9.

As noted above, the HMDs described herein are configured with sensors and other electronic components that can be configured to detect the user associated with a specific light seal, either through a detection and identification of the light seal via an identification feature thereof, or via the detection of the user himself/herself (for example, via facial recognition or iris matching) or the detection of other electronic devices worn or held by the user (for example, a user authenticated electronic watch or mobile phone). In turn, the HMDs described herein can then produce one or more outputs indicating to the user whether or not the light seal being connected or already connected to the HMD is the correct light seal fitted/customized to that user.

Figure 10:
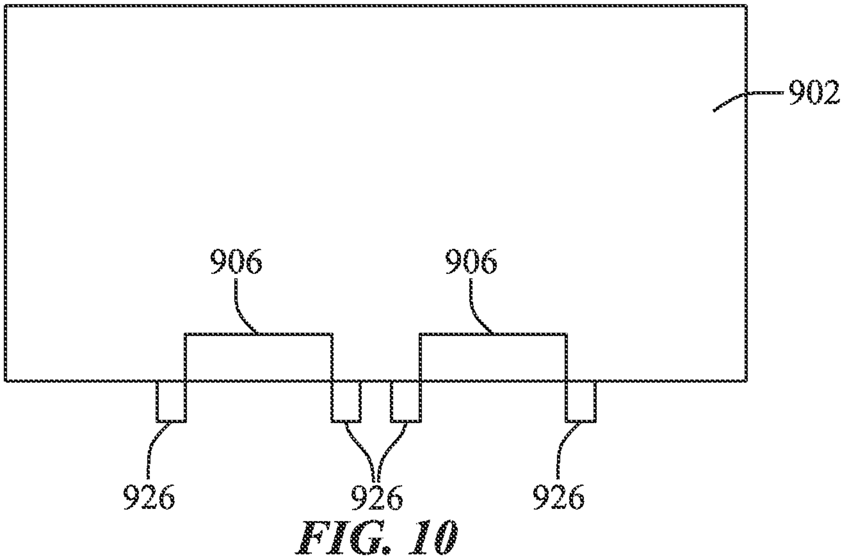
FIG. 10 shows a top view of an example of a head mountable display device.

Additionally, in some examples, one or more of the light seals described herein, which are configured to be removably connectable to an HMD, can be incompatible for use with, and connection to, a particular HMD regardless of the user's identity. For example, at least some HMDs can include certain features or components that are not compatible to be used in conjunction with certain light seals. As an example, FIG. 10 shows a top view of and HMD 902 that includes displays 906 and optical lens connection features 926. Optical lens connection features 926 can be disposed on or with the HMD 902 to accommodate optical lenses disposed adjacent to the displays 906 between the user's eyes and the displays 906 when the user dons the HMD 902. In at least one example, the optical lenses can include corrective prescriptive lenses unique to a certain user.

Figure 11:
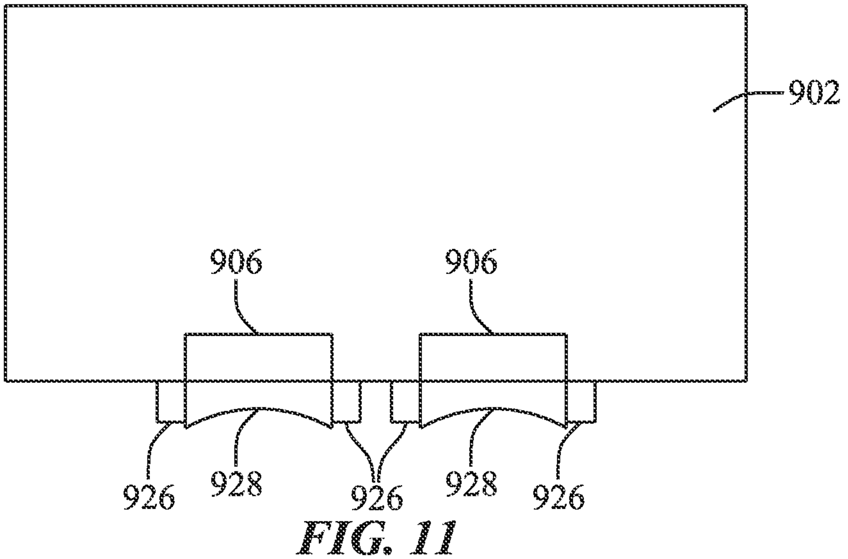
FIG. 11 shows a top view of an example of a head mountable display device.

As shown in FIG. 11, optical lenses 928 can be removably or permanently secured to the HMD 902, adjacent to the displays 906 between the displays 906 and the user's eyes when donned, via the optical lens connection features 926. In at least one example, the optical lenses 928 can include one or more identification features that can be detected by the HMD 902. In this way, the optical lenses 928 can be used to identify the user of the HMD 902 corresponding with the prescription of the lenses 928. In at least one example, the identification feature of the lenses 928 can include the curvature and/or other physical or optical features of the prescription of the lenses 928, as detected or sensed by one or more optical sensors of the HMD 902.

Any of the features, components, parts, including the arrangements and configurations thereof shown in FIGS. 10 and 11 can be included, either alone or in any combination, in any of the other examples of devices, features, components, and parts shown in the other figures. Likewise, any of the features, components, parts, including the arrangements and configurations thereof shown in the other figures can be included, either alone or in any combination, in the example of the devices, features, components, and parts shown in FIGS. 10 and 11.

Figure 12:
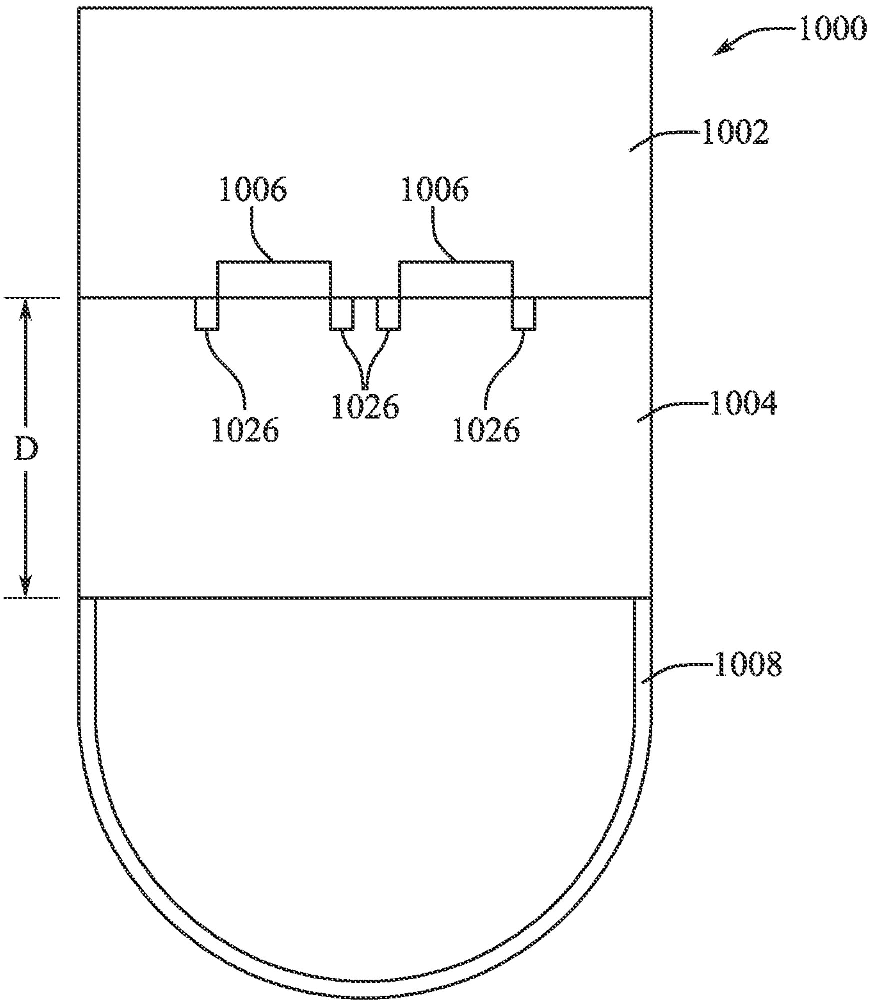
FIG. 12 shows a top view of an example of a wearable electronic device.

Further, as shown in the top view of FIG. 12, a light seal 1004 can be removably connected to an HMD 1002 of a device 1000 such that optical lenses can be positioned between the displays 1006 and a user's eyes when the securement band 1008 secures the device 1000 to the user's head. A depth D of the light seal 1004 indicates a distance between the user's eyes and the displays 1006. As shown in FIG. 12, the depth D extends from one edge (a front edge) of the light seal 1104 to another edge (a rear edge) of the light seal 1104. In one or more examples, the user's eyes may or may not be positioned right at the rear edge of the light seal 1004 but the depth D of the light seal 1004, as denoted in FIG. 12, generally indicates or determines a corresponding distance between the user's eyes and the displays 1006. The distance between the display, or the light generated by the displays 1006, and the user's eyes is important to control such that images generated are seen in focus by the user.

Figure 13:
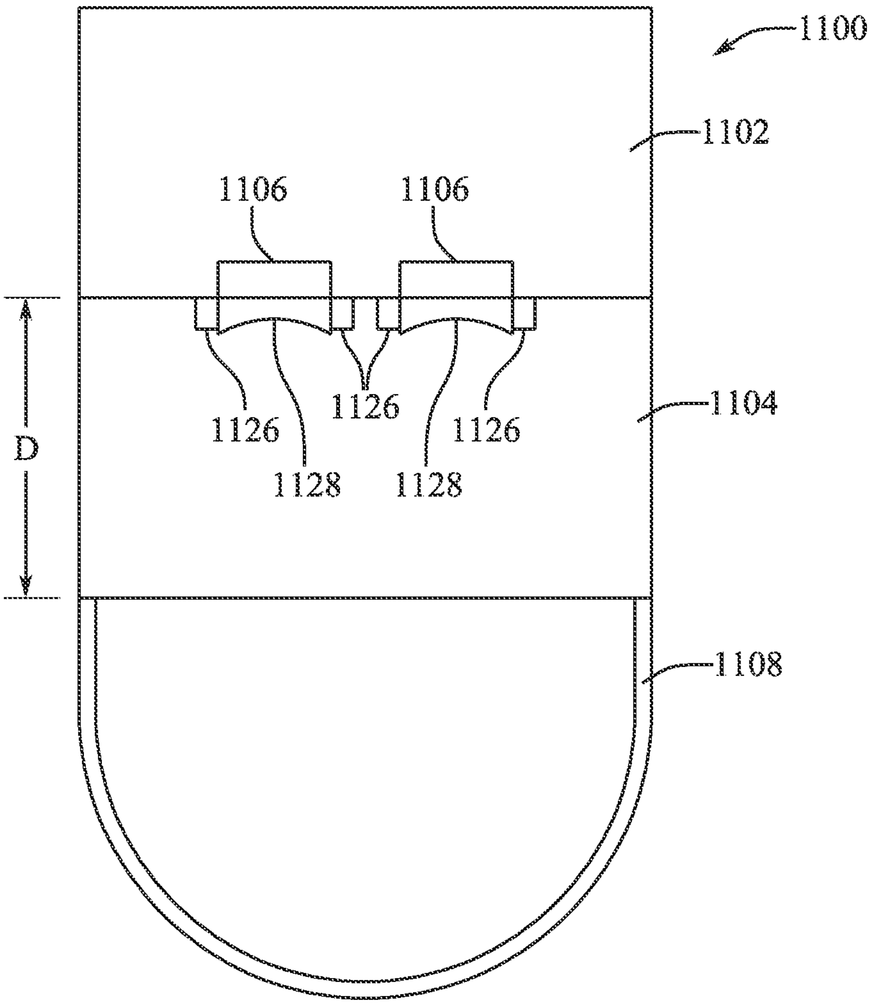
FIG. 13 shows a top view of an example of a wearable electronic device.

In at least one example, any of the identification features described herein, and the associated user-specific data and settings, can include information regarding the depth D of the light seal 1004. In one example, where no optical lenses are connected to the optical lens connection features 1026, as shown in FIG. 12, a light seal 1004 having a certain depth D may be most appropriate for a user. However, as shown in FIG. 13, a light seal 1104 with a depth D may be more appropriate for a user when the user utilizes optical lenses 1128 and the device 1100 is donned via the securement band 1108. In at least one example, when the optical lenses 1128 are connected to the optical lens connection features 1126, the HMD 1102 can detect the presence of the optical lenses 1128 using one or more sensors (not shown). In at least one example, such sensors can be a part of, or can be disposed with, the optical lens connection features 1126.

Particularly, in some examples, the HMD 1102 can be configured to determine whether or not the optical lenses 1128 are connected using one or more sensors and/or other electronic components described herein. The presence of the optical lenses necessarily changes the appropriate depth D of the light seal 1104 relative to a depth D that would be appropriate when the optical lenses 1128 are not present, as shown in FIG. 12. This is because when the optical lenses 1128 are present, as shown in FIG. 13, the distance between the user's eyes and a proximal surface of the lenses 1128 is what determines the correct distance to achieve a focused image produced/generated at or by the displays 1106, rather than a distance between the user's eyes and the displays 1106 themselves.

A light seal 1104 having an appropriate depth D, which properly positions the user's eyes relative to the optical lenses 1128, is used for delivering a quality VR/AR experience to the user. Thus, this depth D may be different depending on the presence or absence of optical lenses 1128, or the thickness of the lenses 1128 when connected. For example, the depth D of the light seal 1104 shown in FIG. 12, when optical lenses are not connected to the optical lens connection features 1126, can be smaller than the depth D of the light seal 1104 shown in FIG. 13, when optical lenses 1128 are connected to the optical lens connection features 1126.

Thus, information can be relayed or retrieved from one or more memory components of the light seal and/or HMDs described herein that includes a depth of the light seal being connected to the HMD. In one example, the identification features of light seals described herein can be associated with or indicative of the depth D of the light seal. In one example, where the identification feature includes transmitting data or other information to the HMD via electromagnetic signals, the data or other information can include the depth D of the light seal. In at least one example, the data or information associated with the identification feature is stored on the HMD and retrieved when the identification feature of the light seal is detected by the HMD. The information or data stored on the HMD can include a depth of the detected light seal.

In conjunction with a detection of the presence of optical lenses connected to optical lens connection features of the HMD, as described herein, the HMD can be configured to output a confirmatory feature to the user that indicates whether the appropriate light seal having the appropriate depth is being or has been connected to the HMD. Likewise, one or more outputs indicating an incorrect light seal can be relayed to the user. These outputs can include one or more of the outputs described above with reference to examples of devices shown in other figures, including FIGS. 6-9.

Any of the features, components, parts, including the arrangements and configurations thereof shown in FIGS. 12 and 13 can be included, either alone or in any combination, in any of the other examples of devices, features, components, and parts shown in the other figures. Likewise, any of the features, components, parts, including the arrangements and configurations thereof shown in the other figures can be included, either alone or in any combination, in the example of the devices, features, components, and parts shown in FIGS. 12 and 13.

Figure 14:
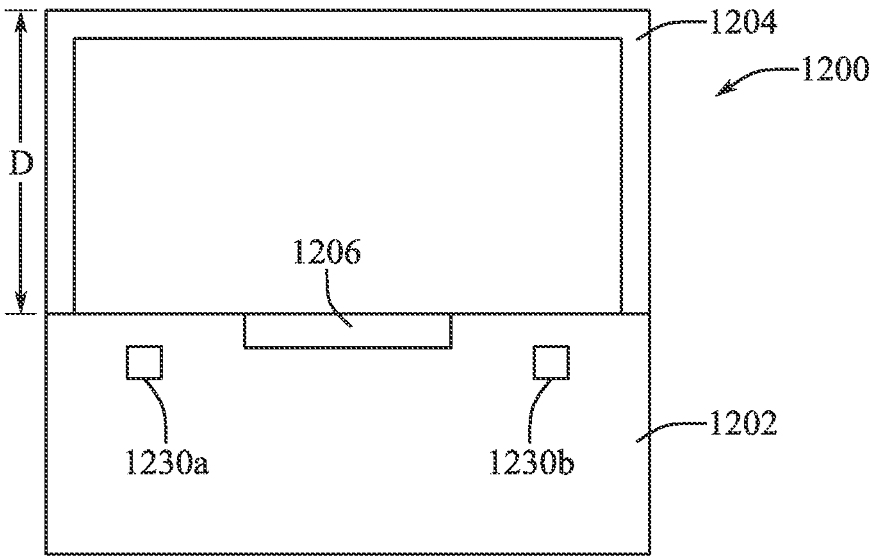
FIG. 14 shows a side cross-sectional view an example of a wearable electronic device.

Additionally or alternatively to determining a presence or depth of a light seal connected to an HMD via an identification feature, some examples of HMD devices can include one or more other sensors that determine a presence and/or depth of a light seal connected thereto. For example, as shown in FIG. 14, an HMD 1202, which includes a display 1206, can include one or more sensors 1230*a*, 1230*b* configured to detect the presence of a light seal 1204 that has been connected thereto. In at least one example, the one or more sensors 1230*a*, 1230*b* can include an ambient light sensor, for example a lux sensor, which senses when the ambient light is blocked by the presence of the light seal 1204. In at least one example, the sensors 1230*a*, 1230*b* can include one or more time of flight sensors that can reflect signals off various surfaces of the light seal 1204 to determine a depth D of the light seal 1204.

Figure 15:
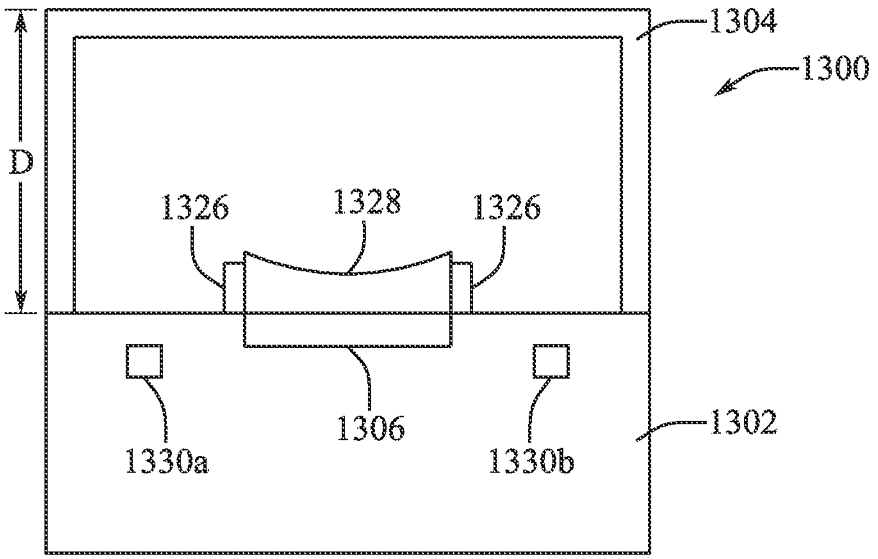
FIG. 15 shows a side cross-sectional view of an example of a wearable electronic device.

As shown in FIG. 14, no optical lenses are connected to the HMD 1202. However, as shown in FIG. 15, an HMD 1302 can include optical lenses 1328 connected above the display 1306 via optical lens connection features 1326. In such an example, sensors 1330*a*, 1330*b* can be configured to determine the depth D of the light seal 1304 when connected to the HMD 1302. In this way, one or more examples can include one or more sensors 1330*a*, 1330*b* that determine the depth and presence of the light seal 1304. Once the depth D of the light seal 1304 is determined, this information can then be processed by the HMD 1302 to determine whether the appropriate/correct light seal 1304 has been, or is being, connected.

Any of the features, components, parts, including the arrangements and configurations thereof shown in FIGS. 14 and 15 can be included, either alone or in any combination, in any of the other examples of devices, features, components, and parts shown in the other figures. Likewise, any of the features, components, parts, including the arrangements and configurations thereof shown in the other figures can be included, either alone or in any combination, in the example of the devices, features, components, and parts shown in FIGS. 14 and 15.

While not necessary for the operation of the present exemplary systems and methods, personal information data can be used to implement and improve on the various embodiments described herein. When used, the personal information data should be gathered pursuant to authorized and well established secure privacy policies and practices that are appropriate for the type of data collected.

It will be understood that the details of the present systems and methods above can be varied and organized in various combinations and with alternative components. Thus, the foregoing descriptions of the specific embodiments described herein are presented for purposes of illustration and description. They are not target to be exhaustive or to limit the embodiments to the precise forms disclosed. The scope of the present systems and methods will be further understood by the following claims.

What is claimed is:

1. An electronic device, comprising:

a head mountable display (HMD) including a sensor; and a light seal removably connectable to the HMD, the light seal comprising an identification feature detectable by the sensor;

wherein:

the identification feature is associated with user information;

the sensor is configured to detect the identification feature; and the head mountable display is to display a confirmatory image when the sensor detects the identification feature.

2. The electronic device of claim 1, wherein:

the HMD further includes a display screen; and the electronic device further comprises a securement band connected to the HMD.

3. The electronic device of claim 1, wherein the light seal further comprises an antenna.

4. The electronic device of claim 3, wherein the identification feature comprises an electromagnetic signal transmitted by the antenna.

5. The electronic device of claim 1, further comprising a memory component disposed in the light seal, the memory component including user-specific data.

6. The electronic device of claim 5, wherein an antenna transmits the user-specific data to the HMD.

7. The head mountable display of claim 1, wherein the light seal is fitted to a face.

8. A wearable electronic device, comprising:

a light seal comprising an identification feature, wherein the light seal comprises a pliable material configured to conform to a user;

a head mountable display (HMD) that is removably connectable to the light seal and includes a display configured to display a confirmatory image associated with the identification feature; and a sensor configured to detect the identification feature;

wherein the confirmatory image is shown on the display when the sensor detects the identification feature.

9. The wearable electronic device of claim 8, wherein the identification feature comprises a unique visual component corresponding to the confirmatory image.

10. The wearable electronic device of claim 9, wherein the confirmatory image and the unique visual component comprise a common color.

11. The wearable electronic device of claim 9, wherein the confirmatory image and the unique visual component comprise a common symbol.

12. The wearable electronic device of claim 8, further comprising an ambient light sensor configured to detect a presence of the light seal.

13. The wearable electronic device of claim 12, further comprising a time of flight sensor configured to detect a depth of the light seal.

14. A head mountable display (HMD), comprising:

a sensor;

an optical lens connection feature; and a removable shroud comprising:

a depth indicating a distance between a user's eyes and an optical lens;

an identification feature associated with the depth; and a processor that determines if the removable shroud is appropriate for connecting to the HMD based on the depth;

wherein the processor is configured to determine whether an optical lens is connected to the optical lens connection feature when determining if the removable shroud is appropriate for connecting to the HMD.

15. The HMD of claim 14, further comprising a display screen, wherein the optical lens connection feature is configured to removably connect an optical lens to the HMD adjacent to the display screen.

16. The HMD of claim 14, wherein the HMD further comprises a memory component configured to store data including the depth.

* * * * *